US012681027B2

(12) United States Patent
Baltasar Badaya

(10) Patent No.: US 12,681,027 B2
(45) Date of Patent: Jul. 14, 2026

(54) METHOD OF HANDLING LABORATORY SAMPLE CONTAINERS AND APPARATUS FOR HANDLING LABORATORY SAMPLE CONTAINERS

(71) Applicant: Roche Diagnostics Operations, Inc., Indianapolis, IN (US)

(72) Inventor: Raul Baltasar Badaya, Stuttgart (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 521 days.

(21) Appl. No.: 16/597,948

(22) Filed: Oct. 10, 2019

(65) Prior Publication Data

US 2020/0124628 A1    Apr. 23, 2020

(30) Foreign Application Priority Data

Oct. 23, 2018    (EP) ..................................... 18202160

(51) Int. Cl.
*G01N 35/00*          (2006.01)

(52) U.S. Cl.
CPC ... *G01N 35/00623* (2013.01); *G01N 35/0099* (2013.01)

(58) Field of Classification Search
CPC ......... G01N 35/00623; G01N 35/0099; G01N 2035/0406; G01N 2035/0412;
(Continued)

(56) References Cited

U.S. PATENT DOCUMENTS 4,303,611 A    12/1981    Jessop
5,366,896 A  *  11/1994    Margrey ................ G16H 10/40
436/55
(Continued)

FOREIGN PATENT DOCUMENTS

| CN | 101995480 A | 3/2011 |
|----|-------------|--------|
| CN | 102527458 A | 7/2012 |

(Continued)

OTHER PUBLICATIONS

Danielle Collins, What's the difference between torque mode and velocity mode in servo control?, May 12, 2020, Motion Control Tips, pp. 2-3 (Year: 2020).*

(Continued)

*Primary Examiner* — Benjamin R Whatley
*Assistant Examiner* — Curtis A Thompson
(74) *Attorney, Agent, or Firm* — Thomas E. Lees, LLC

(57)          ABSTRACT

A method of handling laboratory sample containers is disclosed. The method comprises moving a laboratory sample container to a target position. The target position is a position at which the laboratory sample container is inserted into a corresponding orifice of a laboratory sample container rack provided that the laboratory sample container rack is placed at an intended position. The laboratory sample container is prevented from moving vertically due to gravity if correctly inserted into the corresponding orifice of the laboratory sample container rack. The method also comprises releasing the laboratory sample container in a vertical direction such that the laboratory sample container can move in the vertical direction due to gravity, determining if the laboratory sample container moves in the vertical direction, and performing an error procedure if it is determined that the laboratory sample container moves in the vertical direction.

4 Claims, 1 Drawing Sheet

(58) Field of Classification Search
CPC ........ G01N 2035/0491; G01N 35/1011; B01L
9/00; B01L 9/50; B01L 2200/04; B01L
220/143; B01L 2200/18
See application file for complete search history.

(56) References Cited

U.S. PATENT DOCUMENTS

| | | | |
|---|---|---|---|
| 6,177,050 B1 | 1/2001 | Bybee et al. | |
| 6,544,799 B1 * | 4/2003 | Lewis .................... G01N 30/24 | 422/63 |
| 8,168,137 B2 | 5/2012 | Powell et al. | |
| 9,283,557 B2 | 3/2016 | Maslana et al. | |
| 10,775,400 B2 | 9/2020 | Eberle | |
| 2001/0048899 A1 * | 12/2001 | Marouiss ........... B01L 3/50853 | 422/63 |
| 2004/0267405 A1 * | 12/2004 | Ingenhoven .......... B25J 19/021 | 700/245 |
| 2007/0110627 A1 | 5/2007 | Nagai et al. | |
| 2008/0282816 A1 | 11/2008 | Dale et al. | |
| 2013/0088031 A1 * | 4/2013 | Jones .................. B25J 15/0028 | 294/203 |
| 2013/0096718 A1 * | 4/2013 | Friedman ............... B25J 9/1692 | 700/254 |
| 2013/0136569 A1 * | 5/2013 | Rosmarin ............. B25J 9/1612 | 414/618 |
| 2015/0142171 A1 * | 5/2015 | Li ......................... B25J 9/1692 | 700/251 |
| 2015/0343647 A1 * | 12/2015 | Garcia .................... B25J 17/00 | 294/200 |
| 2016/0139138 A1 | 5/2016 | Burd et al. | |
| 2016/0299161 A1 * | 10/2016 | Mellars .............. G01N 35/0099 | |
| 2016/0362677 A1 | 12/2016 | Williams et al. | |
| 2019/0250180 A1 * | 8/2019 | Pollack ................ G05B 19/401 | |
| 2019/0277869 A1 * | 9/2019 | Stein .................... G01N 35/026 | |
| 2019/0299415 A1 * | 10/2019 | Pollack .............. G01N 35/0099 | |
| 2019/0351123 A1 * | 11/2019 | Norman ................ A61M 1/166 | |

FOREIGN PATENT DOCUMENTS

| | | | | |
|---|---|---|---|---|
| CN | 104040352 A | 9/2014 | | |
| CN | 105765389 A | 7/2016 | | |
| CN | 108031502 A | 5/2018 | | |
| EP | 2982439 A1 | 2/2016 | | |
| EP | 3211426 A1 | 8/2017 | | |
| JP | S 62287161 A * | 6/1986 | ............... | B01L 9/00 |
| WO | 2002/087762 A1 | 11/2002 | | |
| WO | 2003/035260 A1 | 5/2003 | | |
| WO | 2006/017611 A1 | 2/2006 | | |
| WO | 2009/019448 A2 | 2/2009 | | |
| WO | 2011/091974 A1 | 8/2011 | | |
| WO | 2012/048154 A1 | 4/2012 | | |
| WO | 2012069925 A1 | 5/2012 | | |
| WO | 2014/036521 A1 | 3/2014 | | |
| WO | 2017/143182 A2 | 8/2017 | | |

OTHER PUBLICATIONS

European Search Report issued Apr. 5, 2019, in Application No. EP 18202160.0, 2 pp.
Chinese Notice of Allowance for Chinese Patent Application No. 201911011954.1, China National Intellectual Property Administration; Beijing, China dated Aug. 27, 2021.

\* cited by examiner

METHOD OF HANDLING LABORATORY SAMPLE CONTAINERS AND APPARATUS FOR HANDLING LABORATORY SAMPLE CONTAINERS

CROSS-REFERENCE TO RELATED APPLICATIONS

This application claims priority to EP 18202160.0, filed Oct. 23, 2018, which is hereby incorporated by reference.

BACKGROUND

The present disclosure generally relates to a method of handling laboratory sample containers and to an apparatus for handling laboratory sample containers.

There is a need for a method of handling laboratory sample containers and an apparatus for handling laboratory sample containers that ensure safe handling of the laboratory sample containers.

SUMMARY

According to the present disclosure, an apparatus and method of handling laboratory sample containers are presented. The method can comprise moving a laboratory sample container to a target position (TP). The target position (TP) can be a position at which the laboratory sample container can be inserted into a corresponding orifice of a laboratory sample container rack provided that the laboratory sample container rack can be placed at an intended position. The laboratory sample container can be prevented from moving vertically due to gravity if correctly inserted into the corresponding orifice of the laboratory sample container rack. The method can also comprise releasing the laboratory sample container in a vertical direction (z) such that the laboratory sample container moves in the vertical direction (z) due to gravity, determining if the laboratory sample container moves in the vertical direction (z), and performing an error procedure if it is determined that the laboratory sample container moves in the vertical direction (z).

Accordingly, it is a feature of the embodiments of the present disclosure to provide for a method of handling laboratory sample containers and an apparatus for handling laboratory sample containers that ensures safe handling of the laboratory sample containers. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figures 1A, 1B:
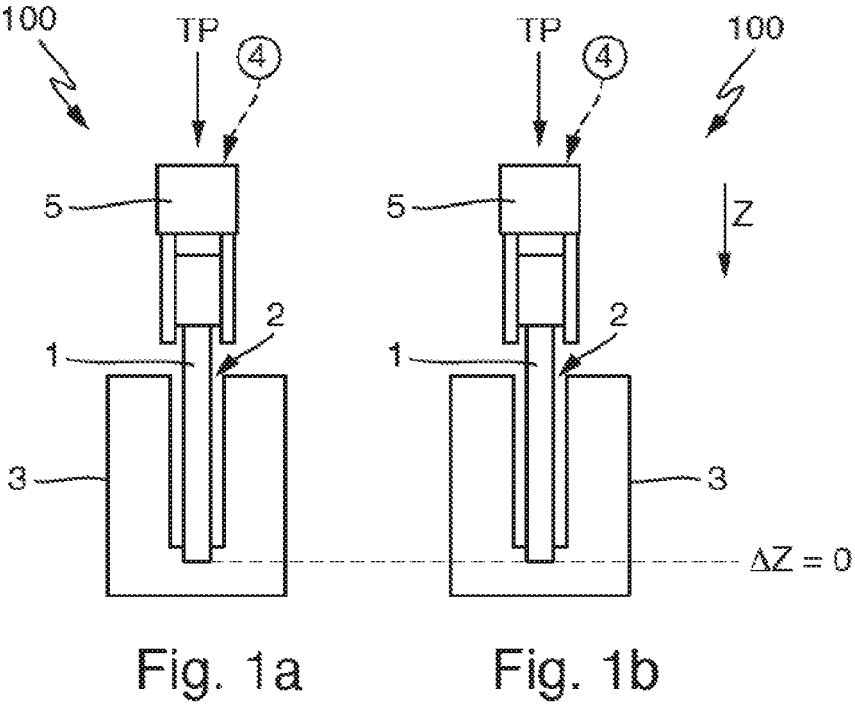
FIG. 1a illustrates a scenario when a laboratory sample container rack is placed at an intended position and a laboratory sample container is inserted into an orifice of the laboratory sample container rack before a vertical releasing of the laboratory sample container according to an embodiment of the present disclosure.
FIG. 1b illustrates depicts the scenario of FIG. 1a after a vertical releasing of the laboratory sample container according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The method of handling laboratory sample containers can comprise the following steps. A laboratory sample container can be moved to a target position, wherein the target position can be a position at which the laboratory sample container can be inserted into a corresponding orifice or reception of a laboratory sample container rack provided that the laboratory sample container rack is placed at an intended (or scheduled/expected) position. Laboratory sample container racks can typically be configured to store a number (e.g., 2 to 128) of laboratory sample containers in corresponding orifices or receptions. The number of laboratory sample containers to be stored in the laboratory sample container rack can depend on the type of the laboratory sample container rack. Reference insofar is also made to the relevant technical literature. The laboratory sample container can be prevented from moving vertically due to gravity if inserted into the corresponding orifice of the laboratory sample container rack at the target position. If the laboratory sample container is correctly inserted into the corresponding orifice of the laboratory sample container rack at the target position, the laboratory sample container rack can form a stopper such that a vertical movement due to gravity can be prevented.

After being placed at the target position, the laboratory sample container can be released in a vertical direction such that due to the releasing, the laboratory sample container can move in the vertical direction due to gravity. In particular, the laboratory sample container can be released in the vertical direction such that the laboratory sample container can fall freely due to gravity, self-evidently provided that the laboratory sample container rack is not in contact with the laboratory sample container. The laboratory sample container can be released such that a free fall can be simulated.

Then, it can be determined if the laboratory sample container moves in the vertical direction. In one embodiment, it can be determined if the laboratory sample container moves in the vertical direction more than a predetermined vertical distance, e.g., about 0.1 mm to about 10 mm.

In embodiment, if it is determined that the laboratory sample container moves in the vertical direction more than the predetermined vertical distance, an error procedure can be performed. The error procedure can indicate that the laboratory sample container rack is not placed at its intended position.

The present disclosure is based on the finding that if the laboratory sample container is correctly inserted in the orifice of the laboratory sample container rack, i.e., the laboratory sample container rack is placed at its intended position, the laboratory sample container rack can prevent a vertical movement of the laboratory sample container due to gravity since the laboratory sample container rack can form a vertical stopper. Thus, if the laboratory sample container does not move vertically, it can be deduced that the laboratory sample container rack is placed at its intended position. On the other hand, if the laboratory sample container moves vertically, it can be deduced that the laboratory sample container rack is not placed at its intended position. To detect the movement, e.g., a motor encoder feedback may be used.

According to an embodiment, the releasing the laboratory sample container in the vertical direction such that the laboratory sample container can move in the vertical direction due to gravity can be performed for a duration between about 10 ms and about 200 ms. After that duration, the laboratory sample container can typically be vertically fixed again. This duration can be sufficient to cause a significant movement in the vertical direction if no rack is present. On the other hand, it can be prevented that the laboratory sample container moves too far vertically.

According to an embodiment, the performing of an error procedure can comprise generating an error message indicating that the laboratory sample container rack is not placed at the intended position.

According to an embodiment, the moving of the laboratory sample container to the target position and the releasing of the laboratory sample container can be performed by one or more electric motors. The electric motor(s) can be operated in a torque mode and in a velocity mode (also called speed mode or standalone mode). In the torque mode, the electric motor can provide an adjustable torque. In the velocity mode, the electric motor can provide an adjustable velocity or speed. The moving of the laboratory sample container can be performed using the velocity mode and the releasing of the laboratory sample container can be performed using the torque mode.

The apparatus for handling laboratory sample containers can be configured to perform the above described method.

According to an embodiment, the apparatus can comprise one or more electric motors configured to move the laboratory sample container.

According to an embodiment, the apparatus can comprise a gripping device having two or more gripping fingers configured to grip a laboratory sample container.

The present disclosure is based on the finding that if the laboratory sample container is inserted in the orifice of the rack, it can be possible to detect the presence of the rack by releasing the laboratory sample container in a vertical direction for a given duration. If the laboratory sample container rack is placed at its intended position, the laboratory sample container rack can prevent a vertical movement of the laboratory sample container. Thus, if the laboratory sample container does not move, it can be deduced that the laboratory sample container rack is placed at its intended position. If the laboratory sample container moves, it can be deduced that the laboratory sample container rack is not placed at its intended position. To detect the movement, a motor encoder feedback may be used, for example.

FIGS. 1a/b and 2a/b respectively depict an apparatus 100 comprising a gripping device 5 configured to grip or handle laboratory sample containers 1. The apparatus 100 can comprise a number of electric motors 4 configured to drive the gripping device 5, to open and close gripping fingers, and the like. For the sake of explanation, only a single electric motor 4 is depicted. Self-evidently, the apparatus may contain a sufficient number of electric motors 4 to enable the necessary degrees of motional freedom, for example, three electric motors 4 may be provided, one for driving an x axis, one for driving a y axis and one for driving a z axis. Gripping fingers may be actuated by a further motor.

FIG. 1a depicts a situation before a vertical release of the laboratory sample container 1, and FIG. 1b depicts a situation after a vertical release of the laboratory sample container 1, wherein the laboratory sample container 1 has been released vertically for a predetermined release duration.

If a laboratory sample container 1 is to be inserted into a corresponding orifice 2 of a laboratory sample container rack 3, the laboratory sample container 1 can be moved to a target position (TP) by the gripping device 5. The target position (TP) can be a position at which the laboratory sample container 1 can be inserted into a corresponding orifice 2 of the laboratory sample container rack 3 provided that the laboratory sample container rack 3 is placed at an intended position.

After moving the laboratory sample container 1 to the target position (TP), the laboratory sample container 1 can be released in a vertical direction (z) for a predetermined release duration, e.g., 20 ms, such that the laboratory sample container 1 can move in the vertical direction (z) due to gravity provided that no vertical stopper, e.g., in form of the rack 3, is present.

To release the laboratory sample container 1 in the vertical direction, the gripping device 5 such as, for example, the electric motor(s) 4 of the gripping device, can be controlled such that a vertical movement due to gravity may not be prevented or even supported by the gripping device 5. The electric motor 4 providing the vertical movement may, e.g., be used in a torque mode. While releasing the laboratory sample container 1, a defined torque may be set, the torque supporting the vertical movement of the laboratory sample container 1 such as, for example, to overcome friction.

Since the laboratory sample container 1 can be prevented from moving vertically, if inserted into the corresponding orifice 2 of the laboratory sample container rack 3 as depicted in FIG. 1, the vertical position before and after the release can be identical. Consequently, it can be determined that the laboratory sample container 1 does not move in the vertical direction due to the release in the vertical direction. Thus, it can be deduced that the laboratory sample container rack 3 is placed at its intended position.

Figures 2A, 2B:
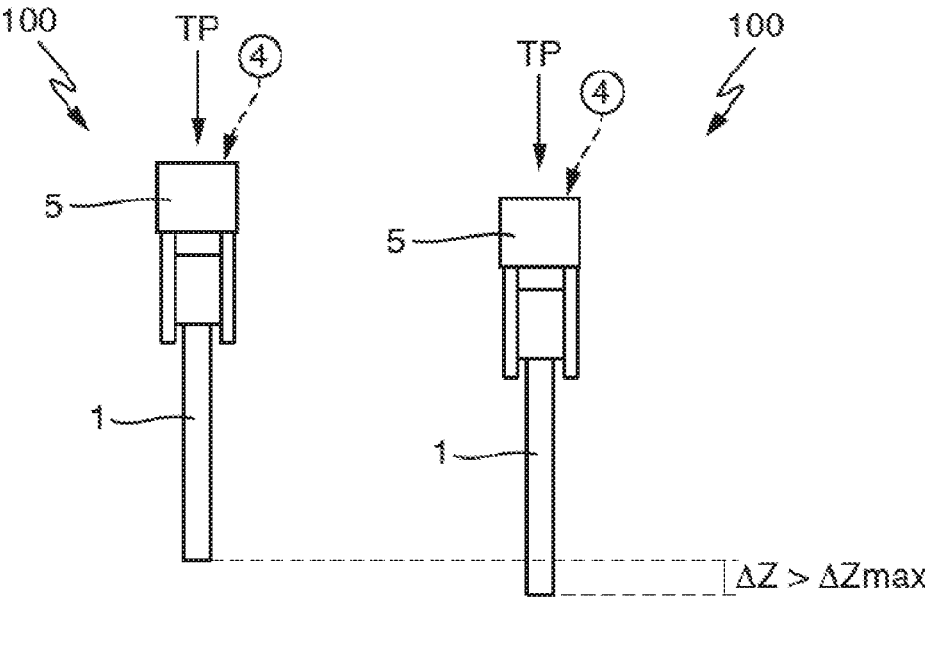
FIG. 2a illustrates a scenario when a laboratory sample container rack is not placed at an intended position before a vertical releasing of the laboratory sample container according to an embodiment of the present disclosure.
FIG. 2b illustrates the scenario of FIG. 2a after a vertical releasing of the laboratory sample container according to an embodiment of the present disclosure.

On the other hand, as depicted in FIGS. 2a/b, if no laboratory sample container rack 3 is present, the vertical position before and after the release differs by $\Delta Z$, e.g., 10 mm, wherein $\Delta Z > \Delta Zmax$. $\Delta Zmax$ denotes a threshold which reflects typical vertical movements for a given release duration provided no laboratory sample container rack 3 is present. Thus, it can be deduced that the laboratory sample container rack 3 is not placed at its intended position and an error procedure can be performed indicating this fault condition.

Typically, the following may be performed: configure motor 4 to apply $F_{motor}$ when switched to torque mode (only once), drive the tube to the target position (TP) in standalone mode, save current motor position, switch to torque mode, wait $t_{detect}$, switch back to standalone mode, save current motor position, and compare first and last position and return the decision rack present/rack not present depending on the threshold $\Delta Zmax$.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method of determining an incorrect placement of a laboratory sample container, the method comprising:
   gripping the laboratory sample container with gripping fingers of a gripping device;
   moving, with an electric motor that is configured to operate in a torque mode that provides an adjustable torque and in a velocity mode that provides an adjustable velocity, the laboratory sample container using the velocity mode to a position intended to be in alignment with an orifice that is defined in a laboratory sample container rack;
   releasing, using the electric motor in the torque mode, the laboratory sample container in a vertical direction (z)

for a duration between 10 ms and 200 ms while maintaining a grip on the laboratory sample container with the gripping fingers;
   detecting for the presence of a free fall movement of the laboratory sample container in the vertical direction (z); and
   generating an error upon determination that the laboratory sample container moved in the vertical direction (z) during the duration, the determination corresponding to indicia that the laboratory sample container rack is not placed at a target position (TP) that is defined as coinciding with a placement of the laboratory sample container within the orifice such that movement of the laboratory sample container in the vertical direction (z) is avoided.

2. The method according to claim 1, wherein the error is an error message indicating that the laboratory sample container rack is not placed at the intended position.

3. The method according to claim 1, wherein the moving of the laboratory sample container is performed using the velocity mode.

4. The method according to claim 1, wherein the releasing of the laboratory sample container is performed using the torque mode.

* * * * *